United States Patent [19]
Frei

[11] 3,795,816
[45] Mar. 5, 1974

[54] APPARATUS TO PREVENT OVERSPEEDING OF A COMBINATION INCLUDING A SUPERCHARGED STEAM GENERATOR, A GAS TURBINE AND A COMPRESSOR

[75] Inventor: Hans Frei, Winterthur, Switzerland

[73] Assignee: Sulzer Brothers Ltd., Winterthur, Switzerland

[22] Filed: Dec. 20, 1972

[21] Appl. No.: 317,053

[30] Foreign Application Priority Data
May 9, 1972 Switzerland.....................6852/72
July 17, 1972 Switzerland..................10698/72

[52] U.S. Cl. ............................. 290/40 B, 290/52
[51] Int. Cl. .......................................... F01k 13/02
[58] Field of Search........................ 290/40, 51, 52

[56] References Cited
UNITED STATES PATENTS
3,061,533  10/1962  Shannon et al. ................... 290/52 X
3,609,384   9/1971  Strohmeyer, Jr. ..................... 290/40
3,657,552   4/1972  Park ................................ 290/40 B Primary Examiner—Bernard A. Gilheany
Assistant Examiner—W. E. Duncanson, Jr.
Attorney, Agent, or Firm—Kenyon & Kenyon Reilly Carr & Chapin

[57]  ABSTRACT

A device for preventing the overspeeding of a machine composed of a compressor connected to a gas turbine which drives an electric generator and supercharges a steam generator, said device being normally in an off position but when a drop in load on the generator occurs the device senses the drop and is activated and sprays water into the gas flowing to the steam generator or into the gas turbine thereby slowing the gas turbine to prevent overspeeding.

10 Claims, 5 Drawing Figures

APPARATUS TO PREVENT OVERSPEEDING OF A COMBINATION INCLUDING A SUPERCHARGED STEAM GENERATOR, A GAS TURBINE AND A COMPRESSOR

BACKGROUND OF THE INVENTION

1. Field of the Invention

This invention relates generally to devices for dealing with overspeeding in turbo-compressor machinery. More particularly, the invention deals with the prevention of overspeeding when a drop in load in a electric generator occurs in turbo-compressor machines which supercharge a steam generator.

With machine combinations having a supercharged steam generator, for which the claimed apparatus is constructed, the steam generator generally forms an accumulator, which in the event of a sudden shutdown of an electric generator driven by a turbo-compressor supercharging group, still gives off hot gas, even when firing is cut off immediately. In order to avoid dangerous overspeed in the supercharging group, in the event of a drop in load, it has been usual to rapidly open an exhaustgas pipe system, running outside the installation, for example over a roof, so as to discharge the gas into the atmosphere. However, this produces a loud noise, and furthermore entails considerable expense for the exhaust-gas pipe system and its associated rapid-opening valve.

Accordingly, it is an object of the invention to eliminate a need to exhaust combustion gases to atmosphere during a drop in load on a supercharged steam generator.

It is another object of the invention to eliminate noise in a supercharged steam generator during a drop in load.

It is another object of the invention to reduce the cost of constructing and maintaining a supercharged steam generating plant.

2. Summary

Briefly, the invention is directed to a steam generating plant which has a steam generator, a supercharging assembly of a compressor for feeding a flow of compressed air to the steam generator to support combustion of fuel therein and a turbine for receiving and expanding a flow of combustion gas from the generator with the turbine connected to the compressor to drive the compressor in response to the expansion of the combustion gas, and an electric generator drivingly connected to the turbine to generate an output load. The invention provides this plant with a means for injecting water into at least one of the flows of compressed air and combustion gas in response to a drop in the load on the generator. In normal operation, the water injecting means remains in an off position but, in response to a drop in load on the generator, is actuated to spray water into the gas flowing into the generator or to gas turbine. By spraying water in liquid form into the compressed air or the combustion gas a substantial amount of heat is used to heat up and vaporize the water. The resultant gas is thus cooled and the total volume consisting of gas and steam is reduced. The performance of the gas turbine is thereby dropped so rapidly that no dangerous overspeeding occurs.

Injection valves common in steam technology can be used for the injection of the water spray. As a result, the cost of the water injection means of the invention is relatively small. Finally, no noise is produced by the injection of water, and the elimination of special costly exhaust systems is made possible.

In accordance with one advantageous form of carrying out the invention, the water injection means has a differential element associated with a load-measuring device. By means of this differential element, a vanishing signal is produced at a drop of the load, so that the water injection means temporarily injects an amount of water sufficient to neutralize the excess heat imparted by the steam generator to the gas.

In accordance with another way of carrying out the invention, the water injection means is controlled by a regulator which is responsive to the speed of rotation of the supercharger group. In the optimum situation, the regulator has a control circuit which comprises an integrator, whose output, when the water injection means is shut off, is connected with an addition point, to which is sent a desired-value signal for the quantity of water to be injected. In addition, a switch which is operated by a load-measuring device is used to effect a connection from the addition point to the input of the regulator. When there is a drop of load, the switch is actuated by the load measuring device to connect the input of the regulator to another addition point that is, in turn, connected with a device measuring the rotary speed of the supercharger group and to which there is sent a desired value for the rotary speed so that the amount of injected water can be controlled in response to the speed of the group. In this form of construction, the load-measuring device can be connected to yet another switch with which there can be connected selectively a means for adjusting the fuel supply to the steam generator during normal operation, and a signal-emitter for idling of the supercharger group. It is then possible, at a drop in the load, in the first instance by controlling the quantity of water injected, and later on by controlling the firing intensity, to regulate in such a way that the supercharger group continues to run in its idling state.

BRIEF DESCRIPTION OF THE DRAWINGS

These and other objects and advantages of the invention will become more apparent from the following detailed description and appended claims taken in conjunction with the accompanying drawings in which:

Referring to FIG. 1 there is provided a supercharger assembly or group 1 that comprises a compressor 16 and gas turbine 11, and drives an electric generator 15. The output of the compressor 16 is connected by a pipe 2 with a burner 3, disposed in a steam generator 5. The burner 3 is supplied with fuel by a pipe 4, the quantity of fuel can be regulated by means of a valve 12. The steam generator 5 contains an evaporator heating surface 6 and a superheating surface 7, which is connected by a pipe 23 with a steam turbine 24, which in turn drives an electric generator 25. The outlet from the steam turbine 24 is connected to a condenser 27, which through the intermediary of a condensate pump 28 is connected with a feed-water tank 20. The feed-water tank 20 is connected, by a feed-water pipe 26, with the evaporator heating surface 6. There are provided in the pipe 26 a feed pump 21 and a feed-water regulating valve 22. The steam generator 5 is connected, by a gas-outlet pipe 10, to the intake of the gas turbine 11. In the pipe 2 is disposed a water-injecting device 32, which is connected, by a pipe 30, with the feed-water pipe 26. There is provided in the pipe 30 a valve 31 that regulates the quantity of injected water, and the valve is regulated, dependent on a vanishing signal, by a regulator such as a servo-motor 35. To produce the derivative action signal there is provided a differential element 36, connected at its input side with an ammeter or other load measuring means 37 connected with the generator 15, and at its output side with the regulator 35.

Figure 1:
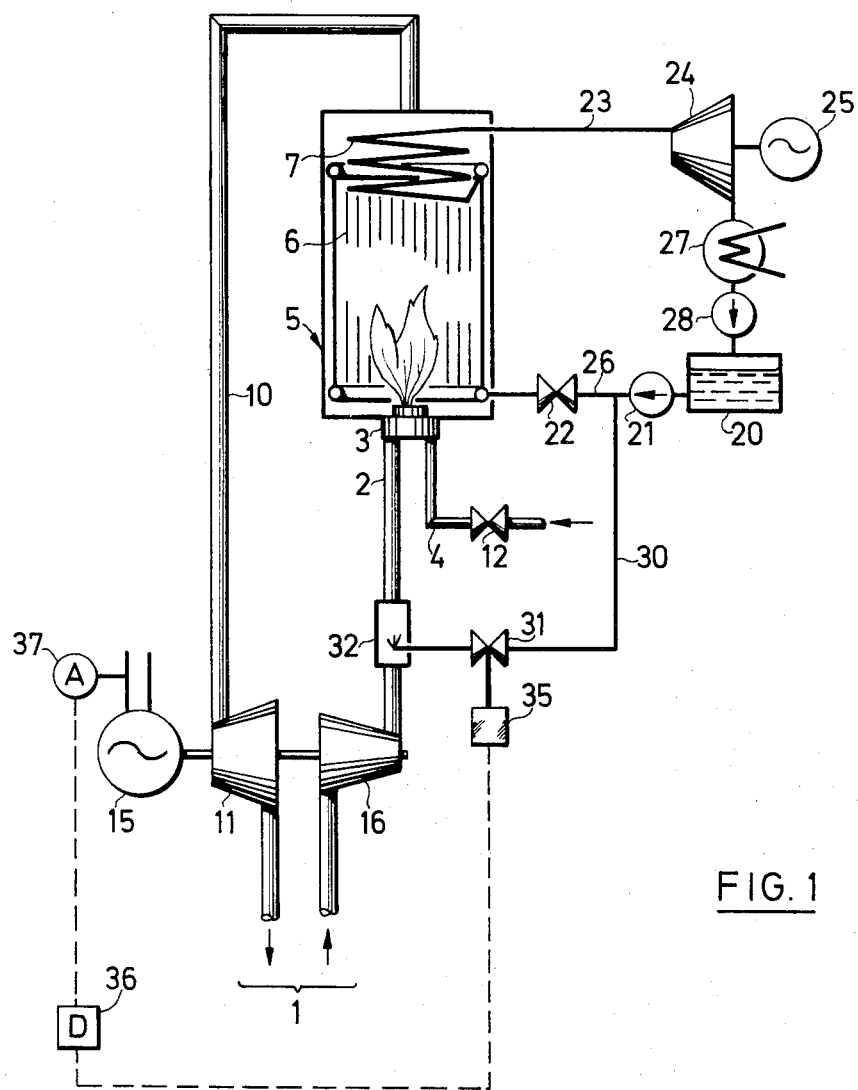
FIG. 1 schematically illustrates in simplified fashion a combined gas-steam power plant containing the apparatus of the invention.

In normal operation of the equipment, a flow of air is compressed in the compressor 16 and conducted through the pipe 2 to the steam generator 5 to support the combustion of the fuel supplied through the pipe 4. A part of the thus liberated heat is transmitted to the operative medium flowing in the heating surfaces 6 and 7 to generate superheated steam. The steam then flows to the steam turbine 24, and thereafter is condensed in the condenser 27. The combustion gas leaves the steam-generator 5 via the pipe 10 at a temperature of 700°, for example, and becomes expanded in the gas turbine 11. During such normal operation, no water is injected by means of the water injecting device 32.

In the case of a load drop, that is a sudden switch-off of the generator 15, there is produced in the differential element 36, and starting from the ammeter 37, a derivative action signal which actuates the regulator 35 of the valve 31 in such a way that water from the pipe 30 is delivered to the injection device 32 in a corresponding manner to the vanishing signal, and is there sprayed as a fine mist into the air-flow leaving the compressor 16. This water absorbs heat from the air-flow and vaporizes, whereby the gas becomes cooled, so that the power from the gas turbine 11 sinks to a value that is practically equal to the power taken by the compressor 16. The rotary speed of the supercharger group 1 thus remains practically constant. At the drop of the load, the fuel supply becomes interrupted, or at least abruptly decreased.

Instead of the injection of the water being dependent on the output of the generator 15, it may also be dependent on some other physical magnitude, for example the rotary speed of the supercharger group.

Figure 2:
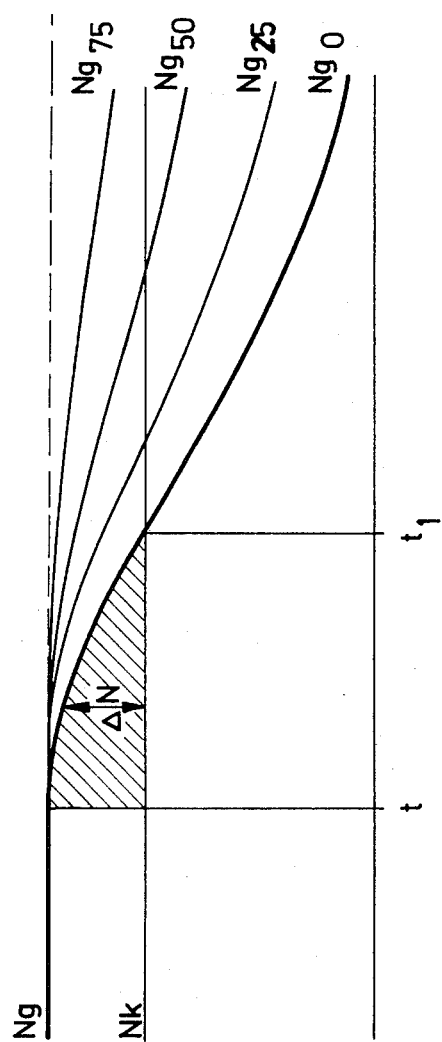
FIG. 2 illustrates the transition functions of energy liberated in the gas turbine at the shut-off of the firing of the steam generator.

Referring to FIG. 2, the power requirement of the compressor 16 is indicated by the straight line $N_k$, and the group of curves $N_g$ indicates the power than can be produced by the gas in the gas turbine 11 for the case where, at instant t, the fire in the steam generator has become reduced to 75 percent, 50 percent, 25 percent, or to zero. If at instant t, because of an electrical switch-off, the power level of the generator 15 diminishes, there nevertheless remains (even with an immediate stoppage of the firing) at first an output difference $\Delta N$, which, without a use of suitable countermeasures, could bring the supercharger group 1 to a dangerous excess speed. By means of the injection of water there are produced additional losses which compensate the excess output of the turbine 11. If the firing at instant t goes back to zero, then there must be injected a quantity of water such that the rotary speed of the supercharger group does not exceed the nominal speed. This quantity of water corresponds to the hatched area in FIG. 2. At the instant $t_1$ the water injection ceases, and the rotary speed of the group goes back asymptotically to zero. If after a drop of load the supercharger group 1 continues to run in the idling state, then at the drop of load the firing is cut back abruptly to the suitable idling value, for example to 50 percent of the quantity used for full load. The rotary speed is thus in the first place regulated through influencing the quantity of water injected, and later on by influencing the firing.

Figure 3:
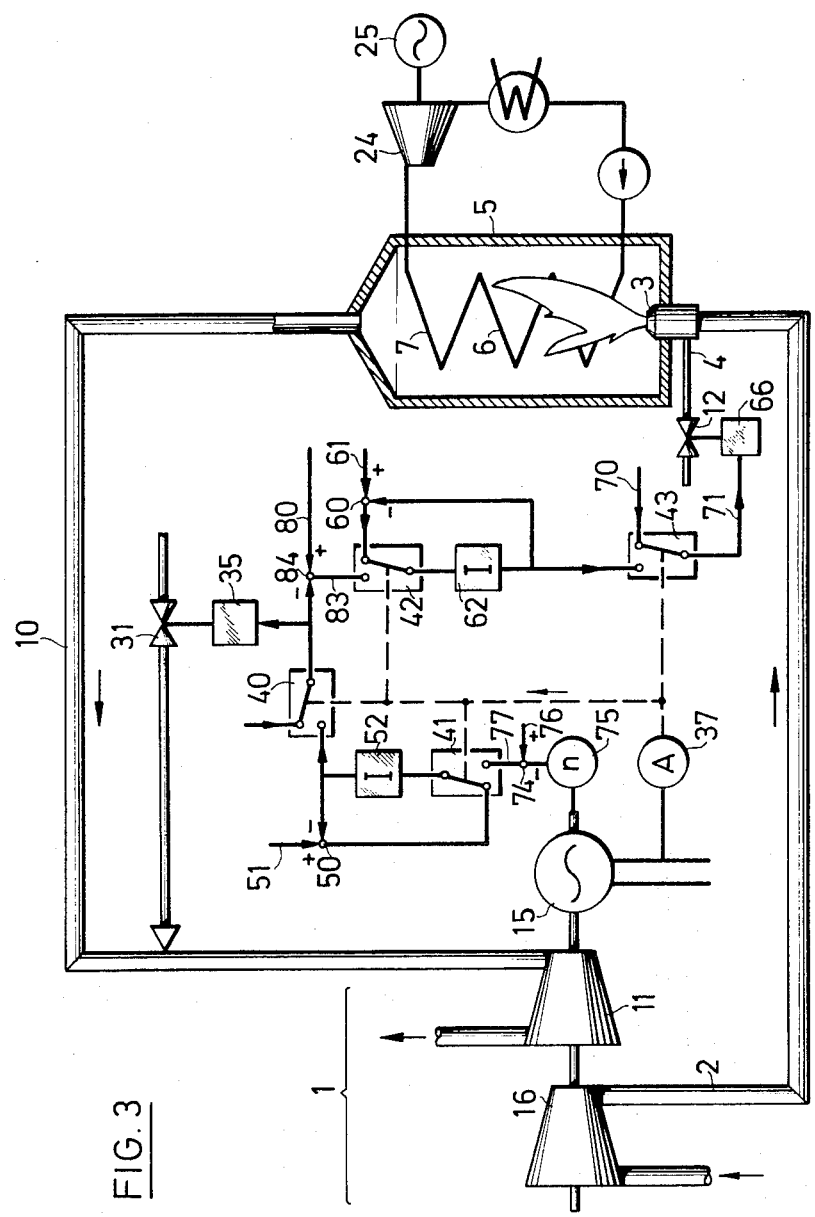
FIG. 3 shows a modified form of construction of the apparatus of the invention.

Referring to FIG. 3, the ammeter 37 is in operative connection with four switches 40, 41, 42 and 43 of a control circuit, all of which are here shown in a position that they assume during normal operation of the combination equipment. The switch 40, in the position shown, ensures that the regulator 35 of the injection valve 31 receives a zero signal, so that the valve 31 is closed.

The switch 41 in its illustrated position ensures than an auxiliary regulatory circuit is closed. In this auxiliary circuit an addition point 50 compares an incoming desired-value signal over a signal line 51 with the output signal of an I-integrator 52 and emits a difference signal resulting from this comparison back to the integrator 52 over the switch 41. The output of the integrator 52 is also connected with a second momentarily free input of the switch 40, in addition to being connected to the point 50. By means of this auxiliary regulating circuit the output signal of the integrator 52 is made equal to the desired value in the line 51. This desired value, which can be adjustable, corresponds to the desired quantity of injected water first injected at a drop of load. To the second momentarily free output of the switch 41 there is connected a signal line 77, in which is produced a signal that corresponds to the difference formed at the addition point 74 between a desired value, supplied over a signal line 76, for the rotary speed of the supercharger group 1, and the actual value of the speed given by a means for measuring the rotary speed of the supercharger assembly 1, such as a tachometer 75.

By means of the switch 42, in its illustrated position, there becomes closed a further auxiliary regulatory circuit, in which, at an addition point 60, a desired-value signal, supplied over a signal line 61, is compared with the output signal of a signal emitting means such as an integrator 62, whereby the difference signal produced from the comparison is sent back, over the switch 42, to the integrator 62. The desired value in the signal line 61 corresponds to the desired initial setting of the valve 12 disposed in the fuel line 4, at a drop of load, this valve being adjusted by a regulator such as a servomotor 66. The second momentarily free input of the switch 42 is connected with a signal line 83, in which is produced a signal that corresponds to the difference formed at the addition point 84, between the regulatory signal to the regulator 35 and a desired-value signal supplied over a signal line 80. This desired-value signal in the line 80 corresponds to a very small opening of the injection valve 31, that suffices for a fine adjustment.

The switch 43 in its illustrated position conducts to the regulator 66 of the valve 12 either a first control signal for the quantity of fuel to be injected, which goes over signal lines 70 and 71 and which is produced in a previously known way from a desired location in the combined equipment, or a second control signal corresponding to the amount of water injected via the integrator 62.

At a drop of load the four switches 40 to 43 are reversed via the ammeter 37, whereby the switch 40 connects the output of the integrator 52 with regulator 35, so that the regulator 35 in the first place adjusts the injection valve 31 in accordance with the initially desired value (desired value in signal line 51) for the quantity of water to be injected.

The switch 41, after its reversal, connects the signal line 77 with the input of the integrator 52, so that this integrator after it has supplied to the regulator 35 the initial value for the quantity of water to be injected, begins to regulate the speed of the supercharger group by altering the quantity of water being injected.

After the reversal of the switch 43 the regulator 66 receives first, instead of the first control signal supplied over the signal line 70, the output signal of the integrator 62, which corresponds to the desired value in the signal line 61 and represents a second control signal of less magnitude than the first to lower the amount of fuel injected for idling purposes.

After the reversal of the switch 42, this switch connects the signal line 83 with the input of the integrator 62, so that this integrator then, after it has supplied to the regulator 66 the desired value for the initial setting of the valve 12, receives the difference between the adjusting signal of the regulator 35 and the desired-value signal in the line 80. The integrator 62 works very slowly in comparison with the integrator 52.

The switch arrangement shown in FIG. 3 has the special advantage that at a drop of load the speed of the supercharger group automatically becomes held at the nominal speed, whereby the fuel consumption and the consumption of injected water are minimal. The generator can thus be switched back into the network at a later time within a relatively short time.

Figure 4:
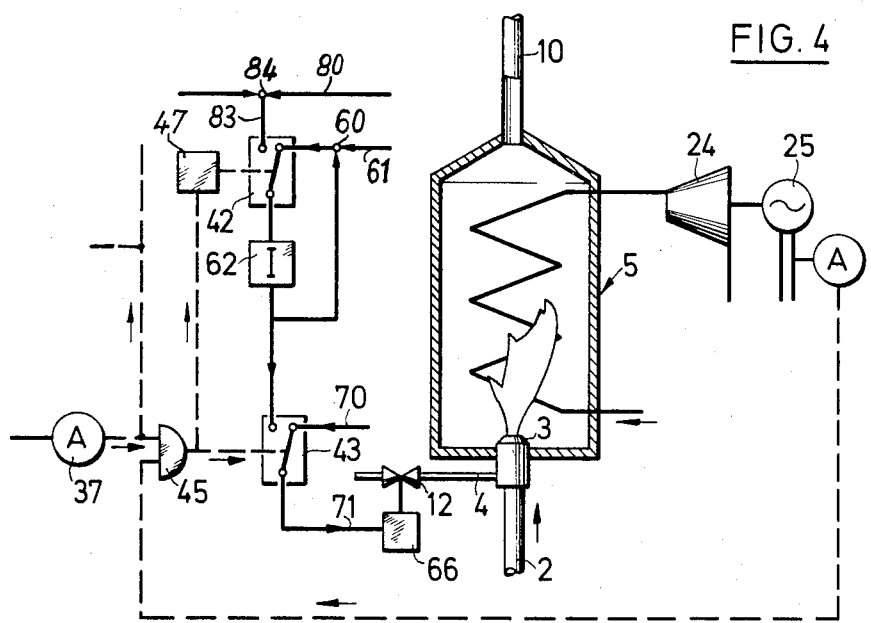
FIG. 4 shows a modified form of construction of the apparatus of the invention.

Referring to FIG. 4, wherein like reference numerals indicate like parts as above, in order to insure that the steam turbine 24 does not have a reduction of power upon failure of the generator 15 of the supercharging group 1 because of the decrease of the heating of burner 3, the signal operating the switches 42 and 43 is conducted over an AND element 45, to which the operative state of the generator 25 is also conducted. This AND element 45 serves to reverse the switches 42 and 43 only when there is also a load drop at the generator 25. Another difference of the arrangement of FIG. 3 is that a time-delay device 47 is disposed between the AND element 45 and the switch 42 to reverse the switch 42 with a delay in comparison with switch 43. The arrangement of FIG. 4 has the advantage that it becomes possible to avoid additional derangements.

It is also possible to omit the time-delay device 47 in the arrangement of FIG. 4, and to connect the AND element directly with the switch 42. It is also possible, with the arrangement of FIG. 3, to provide a time-delay device in the signal line leading to the switch 42.

Figure 5:
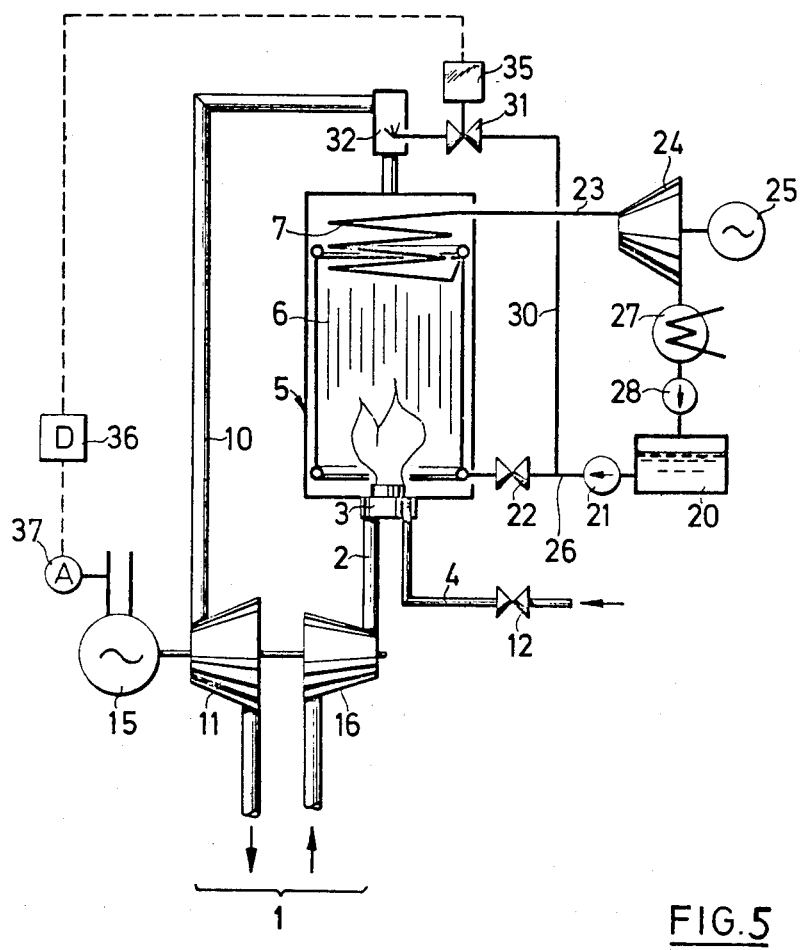
FIG. 5 shows a modified form of construction of the apparatus of the invention.

Referring to FIG. 5 the water-injecting device 32 is disposed in the pipe 10 between the outlet from the steam generator 5 and the inlet into the gas turbine 11.

For the rest, the construction of this equipment corresponds to that of FIG. 1 as indicated by like reference characters.

What is claimed is:

1. In combination with a steam generator, a supercharger assembly having a compressor for feeding a flow of compressed air to said steam generator to support combustion of fuel therein and a turbine for receiving and expanding a flow of combustion gas from said steam generator, said turbine being drivingly connected to said compressor to drive said compressor in response to the expansion of said flow of combustion gas, and an electric generator drivingly connected to said turbine to generate an output load; means for injecting water into at least one of said flows of compressed air and combustion gas in response to a drop in said load.

2. The combination as set forth in claim 1 wherein said water injecting means is connected upstream of said steam generator to inject water into said flow of compressed air.

3. The combination as set forth in claim 1 which further includes a regulator connected to said water injecting means to control the amount of water injected into said one flow and a load measuring means connected between said electric generator and said regulator to actuate said regulator to control the amount of injected water in response to a drop in said load.

4. The combination as set forth in claim 3 which further includes a differential element connected between said regulator and said load measuring means for emitting a vanishing signal to said regulator in response to a drop in said load to actuate said regulator to temporarily inject water into said one flow.

5. The combination as set forth in claim 3 which further includes a control circuit having an integrator including an output for emitting a first signal;

a first addition point for receiving a desired-value signal corresponding to a desired quantity of water to be injected in response to a drop in said load and connected to said integrator output to receive said first signal to compare said signals and to emit a first differece signal therefrom;

means for measuring the rotary speed of said supercharger assembly and emitting a second signal in response thereto;

a second addition point for receiving a desired-value signal corresponding to a desired-value for the rotary speed of said supercharger assembly and connected to said rotary speed measuring means to receive said second signal to compare said signals and to emit a second difference signal therefrom;

a first switch having a first input selectively connected to said first addition point, a second input selectively connected to said second addition point and an output connected to the inlet of said integrator;

a second switch having a first input for receiving a zero signal to maintain said water injection means closed, a second input selectively connected to said integrator output and an output connected to said regulator; and load measuring means connected to said electric generator and connected to said first and second switches to reverse said switches in response to a drop in said load whereby said second input of said first switch is connected to said second adition point and said second input of said second switch is connected to said integrator output.

6. The combination as set forth in claim 5 further comprising a second auxiliary regulatory circuit having a third switch having a first input for receiving a first control signal for a quantity of fuel to be supplied to said steam generator, a second input connected to a means for emitting a second control signal of less magnitude than said first control signal, and an output for emitting one of said control signals and a regulator connected to said output of said third switch for regulating the amount of fuel supplied to said steam generator in response to said one control signal, said third switch being connected to said load measuring means for selective reversal of said third switch to connect said second input to said output thereof.

7. The combination as set forth in claim 6 wherein said means for emitting a second control signal is selectively connected to said output of said second switch to emit said second control signal in response to the amount of water injected.

8. The combination as set forth in claim 7 wherein said signal emitting means is a second integrator.

9. The combination as set forth in claim 8 which further comprises a time-delay device connected to said second integrator to delay actuation thereof after reversal of said third switch.

10. The combination as set forth in claim 1 which further includes means for feeding water to said steam generator, said water injecting means being selectively connected to said water feeding means to receive water therefrom.

* * * * *